(12) United States Patent
Brigham

(10) Patent No.: US 10,286,458 B2
(45) Date of Patent: May 14, 2019

(54) PREDRILL GUIDE TOOLS

(71) Applicant: SIMPSON STRONG-TIE COMPANY INC., Pleasanton, CA (US)

(72) Inventor: Gueary Andrew Brigham, Hendersonville, TN (US)

(73) Assignee: SIMPSON STRONG-TIE COMPANY INC., Pleasanton, CA (US)

( * ) Notice: Subject to any disclaimer, the term of this patent is extended or adjusted under 35 U.S.C. 154(b) by 0 days.

(21) Appl. No.: 15/398,308

(22) Filed: Jan. 4, 2017

(65) Prior Publication Data

US 2018/0141134 A1 May 24, 2018

Related U.S. Application Data

(60) Provisional application No. 62/425,496, filed on Nov. 22, 2016.

(51) Int. Cl.
*B23B 47/28* (2006.01)
*E04F 21/22* (2006.01)
(Continued)

(52) U.S. Cl.
CPC .......... *B23B 47/28* (2013.01); *B23B 2247/10* (2013.01); *B23B 2247/12* (2013.01);
(Continued)

(58) Field of Classification Search
CPC ..... B23B 47/28; B23B 49/02; B23B 2247/10; B23B 2247/12; Y10T 408/56245; Y10T 408/563; Y10T 408/567; Y10T 408/568
See application file for complete search history.

(56) References Cited

U.S. PATENT DOCUMENTS

| 1,016,383 A | 2/1912 | Wellman |
| 2,966,815 A | 1/1961 | Wolfgang |

(Continued)

FOREIGN PATENT DOCUMENTS

| EP | 1595627 A2 | 11/2005 |
| EP | 3323960 A1 | 5/2018 |

(Continued)

OTHER PUBLICATIONS

Deck Master: Accurate Board and Screw Placement dated Aug. 31, 2010 (www.toolmonger.com).

(Continued)

*Primary Examiner* — Eric A Gates
(74) *Attorney, Agent, or Firm* — Shartsis Friese LLP; Cecily Anne O'Regan

(57) ABSTRACT

Predrill guide tools are disclosed which include a body having a vertical planar member with a front side and a back side, a horizontal planar member with a top side, a bottom side and a tapered end, and an angled drill guide with a front face positioned within a vertical plane; two or more ribs extending from a top side of the horizontal planar member, and one or more keels extending vertically from the bottom side of the horizontal planar member. Methods of using the predrill guide tools to drill holes into deck boards for use with deck clips are also disclosed.

22 Claims, 11 Drawing Sheets

(51) Int. Cl.
*E04F 15/02* (2006.01)
*E04F 21/00* (2006.01)

(52) U.S. Cl.
CPC ... *E04F 15/02038* (2013.01); *E04F 15/02044* (2013.01); *E04F 15/02183* (2013.01); *E04F 21/0092* (2013.01); *E04F 21/22* (2013.01); *E04F 2015/02077* (2013.01); *E04F 2015/02083* (2013.01); *E04F 2015/02094* (2013.01); *Y10T 408/563* (2015.01); *Y10T 408/567* (2015.01)

(56) References Cited

U.S. PATENT DOCUMENTS

| | | | |
|---|---|---|---|
| 3,381,551 A | 5/1968 | Lavering et al. | |
| 3,465,620 A * | 9/1969 | Hilburn | B23B 47/287 144/93.1 |
| 3,949,155 A * | 4/1976 | Bourne | H01R 13/5812 174/55 |
| 4,176,989 A | 12/1979 | Wolff | |
| 4,332,514 A | 6/1982 | Dergo | |
| D274,033 S * | 5/1984 | Miller | D8/71 |
| D295,016 S | 4/1988 | Forrester | |
| 4,842,453 A | 6/1989 | Raines et al. | |
| 4,930,225 A | 6/1990 | Phillips | |
| 5,052,112 A | 10/1991 | MacDonald | |
| 5,807,033 A * | 9/1998 | Benway | B23B 47/288 144/346 |
| 6,220,796 B1 * | 4/2001 | Chiang | B23B 47/288 408/115 R |
| 6,254,320 B1 * | 7/2001 | Weinstein | B23B 47/287 408/103 |
| 6,394,713 B1 | 5/2002 | Yates, Sr. | |
| 6,514,020 B2 | 2/2003 | Bandeian et al. | |
| 7,044,460 B2 | 5/2006 | Bolton | |
| 7,484,914 B1 * | 2/2009 | Weinstein | B23B 47/287 408/103 |
| 7,597,513 B2 * | 10/2009 | Chiang | B23B 47/287 408/103 |
| D613,593 S | 4/2010 | King | |
| D632,164 S | 2/2011 | Lappin | |
| 7,946,049 B1 | 5/2011 | Wilton | |
| 7,967,534 B2 * | 6/2011 | McDaniel | B23B 47/287 408/103 |
| 8,007,211 B1 | 8/2011 | Lee et al. | |
| 8,083,443 B1 * | 12/2011 | Circosta | B23B 47/287 408/103 |
| 8,371,556 B2 | 2/2013 | Price | |
| 8,627,624 B2 | 1/2014 | Stockton | |
| 8,793,889 B2 | 8/2014 | Hovren | |
| 8,881,419 B2 | 11/2014 | Madrack | |
| 9,051,726 B2 | 6/2015 | Vandenberg | |
| 9,127,466 B2 * | 9/2015 | Hinkle | E04F 21/22 |
| 9,138,812 B2 | 9/2015 | Stalemark | |
| 9,370,828 B2 | 6/2016 | Adkins et al. | |
| 9,751,197 B2 | 9/2017 | Vandenberg | |
| 9,802,300 B2 * | 10/2017 | Vandenberg | B25B 21/002 |
| 2007/0056243 A1 | 3/2007 | Riccitelli | |
| 2007/0175176 A1 | 8/2007 | Lane | |
| 2010/0083610 A1 | 4/2010 | King | |
| 2012/0051865 A1 * | 3/2012 | Liu | B23B 47/28 408/108 |
| 2013/0174498 A1 | 7/2013 | Hovren | |
| 2014/0366334 A1 | 12/2014 | Gamble et al. | |
| 2017/0087644 A1 * | 3/2017 | Pelkey | B23B 47/287 |
| 2017/0114536 A1 * | 4/2017 | Tebo | E04B 1/40 |

FOREIGN PATENT DOCUMENTS

| | | | |
|---|---|---|---|
| WO | WO 8203587 A1 * | 10/1982 | B25B 1/22 |
| WO | 2000074884 A1 | 12/2000 | |
| WO | 2013134119 A2 | 9/2013 | |
| WO | 2015184298 A1 | 12/2015 | |
| WO | 2015196108 A1 | 12/2015 | |

OTHER PUBLICATIONS

Deckhand decking screw template tool (www.betterhardware.com.au).

How to drill accurate holes for deck post bolts (www.handymanhowto.com).

* cited by examiner

PREDRILL GUIDE TOOLS

CROSS-REFERENCE

This application claims the benefit of U.S. Provisional Application No. 62/425,496, filed Nov. 22, 2016, entitled Predrill Guide Tools and Methods which application is incorporated herein by reference.

BACKGROUND

The installation of decking boards can be a time consuming and tedious part of construction. Because the decking boards cover a large amount of surface area, the decking boards are one of the first things you see when you walk on a deck. In deck construction many different types of materials are used to produce decking boards, from wood, composites, plastic and metal. Not only the materials used to produce the decking a vital part of the deck's strength, just as importantly as the type of material, is the way in which you fasten the decking boards just as vital when building a deck. Spacing of the fasteners off the edges of the decking board is an important part of correctly fastening the decking boards to the joists or the under structure of the deck. Recommended spacing is, for example, between ¾ of an inch to 1 inch and ¼ spacing of fasteners off of the decking board edges.

What is needed is a tool to facilitate accurate placement of a pre-drill hole used for securing a deck with deck clips.

SUMMARY

The guide tool enables a drill bit to engage a deck board at a specified angle and location relative to the deck board. The location of the pre-drill hole allows for hole location that would otherwise be very difficult to achieve without the use of a guide. The guide enables the hole to pass through the deck board at a location above the deck board groove and below the deck board groove. Both right and left handed uses can engage the guide tool at a vertical surface that is to the right of the drill guide or to the left of the drill guide. The guide has multiple contact points at multiple surfaces of the deck board to ensure the pre-drill hole location is accurate. An aperture or cut-out is provided in the horizontal member to allow drilling debris to escape. Support ribs provide increased strength to the guide tool. The disclosed guide tool allows accurate placement of a screw hole in relation to the deck board side and groove. The guide tool allows a hole to be drilled through both the board section above the groove and below the groove. The position of the drill bit is retained as it encounters the vertical and horizontal surfaces during the drilling process.

An aspect of the disclosure is directed to predrill guide tools. Suitable predrill guide tools comprise: a body having a horizontal planar member with a top side, a bottom side and a tapered end, a vertical planar member with a front side and a back side extending from the top side of the horizontal planar member, and an angled drill guide with a front face positioned within a vertical plane; one or more keels extending vertically from the bottom side of the horizontal planar member. Additionally, the angled drill guide can have an aperture that passes through its center along a length of the drill guide. The horizontal planar members can also have a cut-out, or aperture. adjacent the angled drill guide. A front face of the one or more keels is perpendicular to the bottom side of the horizontal planar member. The front face can engage a side surface of the deck board. Two or more ribs can be provided which extend from a top side of the horizontal planar member.

Another aspect of the disclosure is directed to a predrill guide tool comprising: a body having a horizontal planar member with a top side, a bottom side and a tapered end, a vertical planar member with a front side and a back side extending from the top side of the horizontal planar member, and an angled drill guide with a front face positioned within a vertical plane; two or more ribs extending from a top side of the horizontal planar member. The angled drill guide can have an aperture therethrough. Additionally, a cut-out or aperture can be provided adjacent the angled drill guide. One or more keels can be provided that extend vertically from the bottom side of the horizontal planar member. Additionally, a front face of the one or more keels can be positioned perpendicular to the bottom side of the horizontal planar member.

Yet another aspect of the disclosure is directed to methods of predrilling a deck boards. Suitable methods comprise: providing a predrill guide; inserting a portion of the vertical planar member into a groove in the deck board; guiding a drill bit of a drill via the angled drill guide towards a surface of the deck board; and drilling a hole at an angle through the deck board. The predrill guide can have a body with a horizontal planar member with a top side, a bottom side and a tapered end, a vertical planar member and a front side and a back side extending from the top side of the horizontal planar member, and an angled drill guide with a front face positioned within a vertical plane; one or more keels extending vertically from the bottom side of the horizontal planar member with the deck board. Alternatively, the predrill guide can have a body having a horizontal planar member with a top side, a bottom side and a tapered end, a vertical planar member with a front side and a back side extending from the top side of the horizontal planar member, and an angled drill guide with a front face positioned within a vertical plane; two or more ribs extending from a top side of the horizontal planar member. The step of inserting the portion of the vertical planar member into the groove in the deck board can further include pressing the back side of the vertical planar member. Additionally, debris from the drill bit can pass through a cut-out or aperture in the horizontal planar member. The drill bit can also pass through an upper portion of the deck board above the groove and a lower portion of the deck board below the groove.

An aspect of the disclosure is directed to predrill guide tools. Suitable predrill guide tools comprise: a body means having a horizontal planar member means with a top side, a bottom side and a tapered end, a vertical planar member means with a front side and a back side extending from the top side of the horizontal planar member means, and an angled drill guide means with a front face positioned within a vertical plane; one or more keel means extending vertically from the bottom side of the horizontal planar member means. Additionally, the angled drill guide means can have an aperture that passes through its center along a length of the drill guide means. The horizontal planar member means can also have a cut-out, or aperture. adjacent the angled drill guide means. A front face of the one or more keel means is perpendicular to the bottom side of the horizontal planar member means. The front face can engage a side surface of the deck board. Two or more rib means can be provided which extend from a top side of the horizontal planar member means.

Another aspect of the disclosure is directed to a predrill guide tool comprising: a body means having a horizontal planar member means with a top side, a bottom side and a tapered end, a vertical planar member means with a front side and a back side extending from the top side of the horizontal planar member means, and an angled drill guide means with a front face positioned within a vertical plane; two or more rib means extending from a top side of the horizontal planar member means. The angled drill guide means can have an aperture therethrough. Additionally, a cut-out or aperture can be provided adjacent the angled drill guide means. One or more keel means can be provided that extend vertically from the bottom side of the horizontal planar member means. Additionally, a front face of the one or more keels can be positioned perpendicular to the bottom side of the horizontal planar member means.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 9,370,828 B2 issued Jun. 21, 2016 to Adkins et al. for Adjustable doweling jig; U.S. Pat. No. 9,138,812 B2 issued Sep. 22, 2015 to Stalemark for Deck mounting components for attachment of posts and the like; U.S. Pat. No. 9,051,726 B2 issued Jun. 9, 2015 to Vandenberg for Fastener, installation tool and related method of use; U.S. Pat. No. 8,881, 419 B2 issued Nov. 11, 2014 to Madrack for Deck plank spacer and fastener guide tool; U.S. Pat. No. 8,793,889 B2 issued Aug. 5, 2014, to Hovren for Deck board placement tool; U.S. Pat. No. 8,627,624 B2 issued Jan. 14, 2014 to Stockton for Deck drainage system; U.S. Pat. No. 8,371,556 B2 issued Feb. 12, 2013 to Price for Multi-function deck tool; U.S. Pat. No. 7,946,049 B1 issued May 24, 2011 to Wilton for Deck spacing tool; U.S. Pat. No. 7,044,460 B2 issued May 16, 2006 to Bolton for Concealed fastener, system, and associated methods; U.S. Pat. No. 6,514,020 B2 issued Feb. 4, 2003 to Bandeian for Pilot bit guide device; U.S. Pat. No. 5,052,112 A issued Oct. 1, 1991, to MacDonald for Drill guide and support therefore; U.S. Pat. No. 4,842,453 A issued Jun. 27, 1989 to Raines et al. for Guide apparatus for drilling oblique holes; U.S. Pat. No. 4,332,514 A issued Jun. 1, 1982 to Dergo for Dowel drill fixture; U.S. Pat. No. 4,176,989 A issued Dec. 4, 1979 to Wolff for Auxiliary device for boring of dowel holes in boards; US 2007/0175176 A1 published Aug. 2, 2007 to Lane for Ultimate deck Jig; WO 2015/196108 A1 published Dec. 23, 2015 to Tebo for Decking Clip; WO 2015/184298 A1 published Dec. 3, 2015 to Marra for Construction tool apparatus; Deck Master: Accurate Board and Screw Placement dated Aug. 31, 2010 (www.toolmonger.com); Deckhand decking screw template tool (www.betterhardware.com.au); How to drill accurate holes for deck post bolts (www.handymanhowto.com).

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
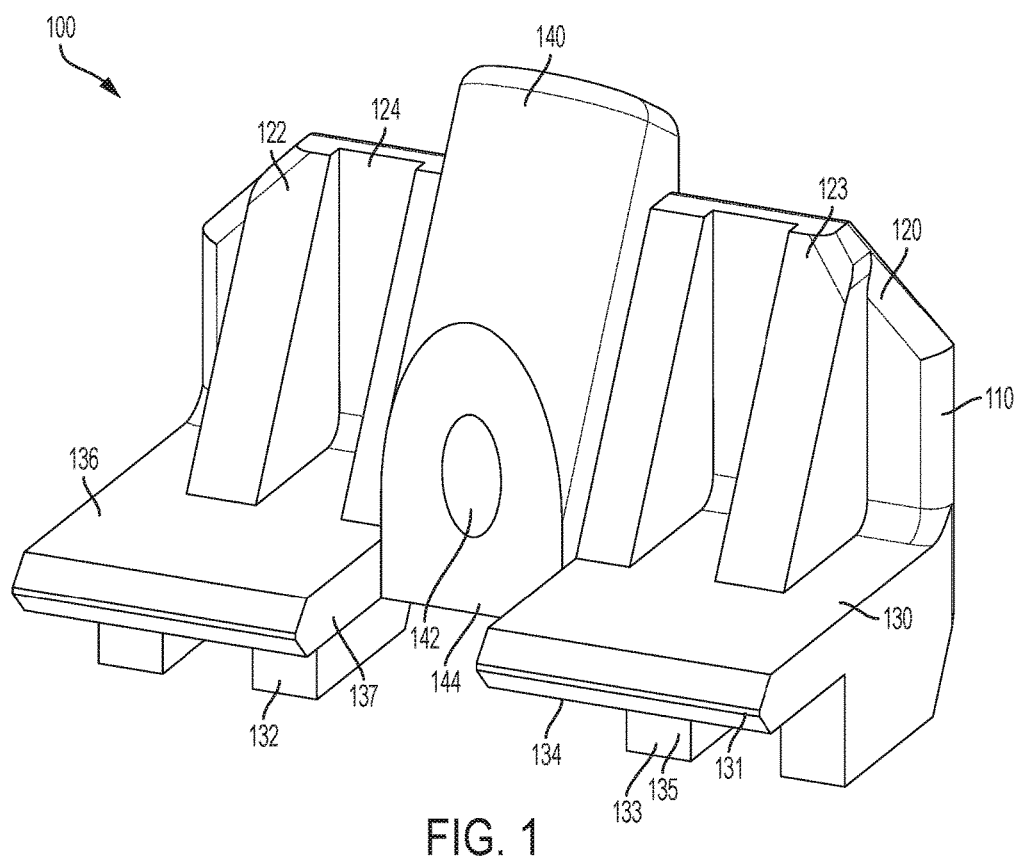
FIG. 1 is a front perspective view of predrill guide tool.
Figure 2:
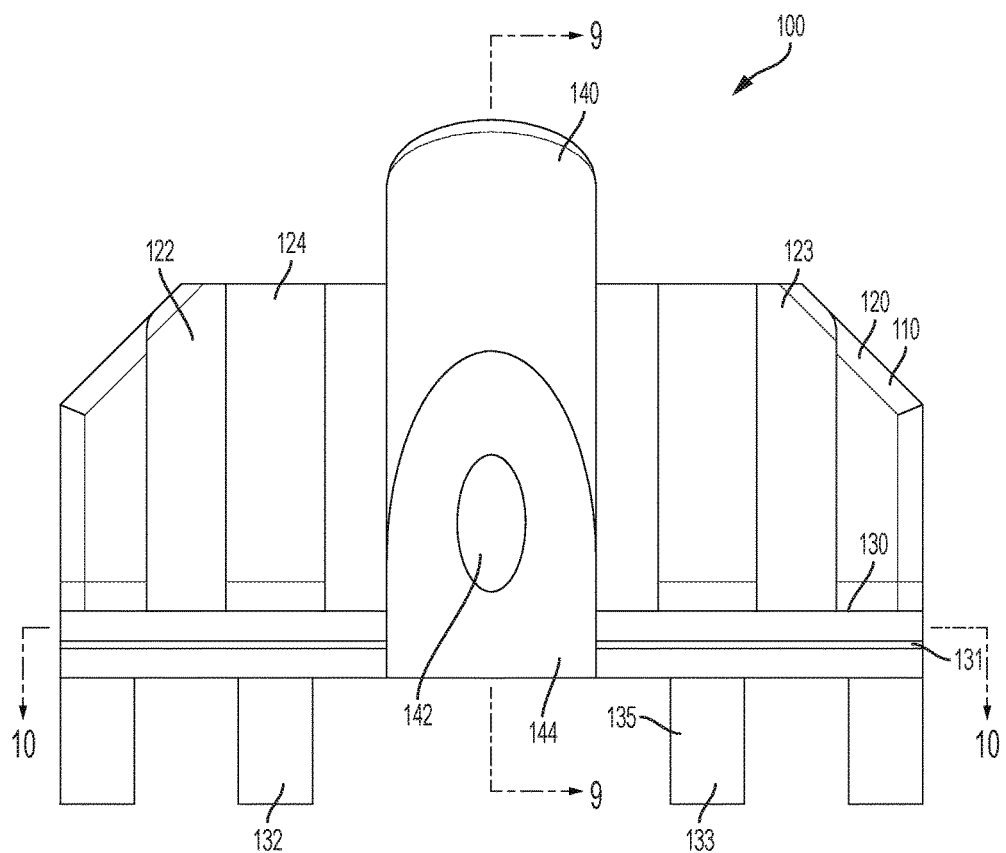
FIG. 2 is a front view of predrill guide tool.
Figure 3:
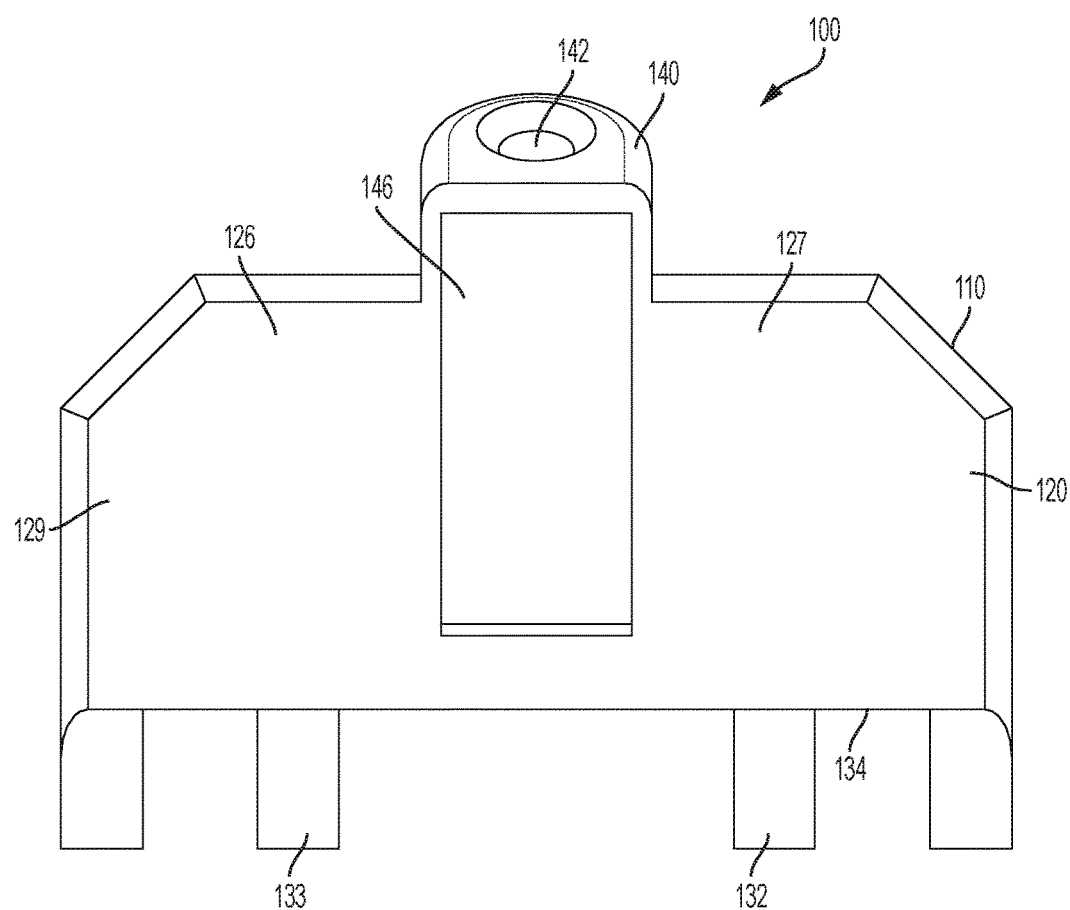
FIG. 3 is a back view of predrill guide tool.
Figure 4:
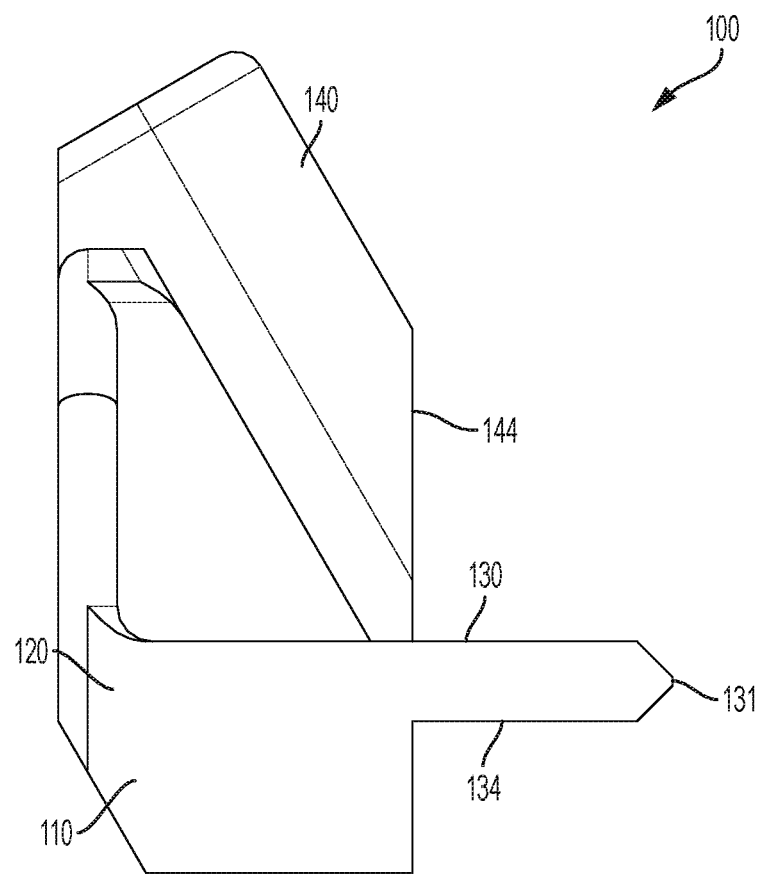
FIG. 4 is a left side view of predrill guide tool.
Figure 5:
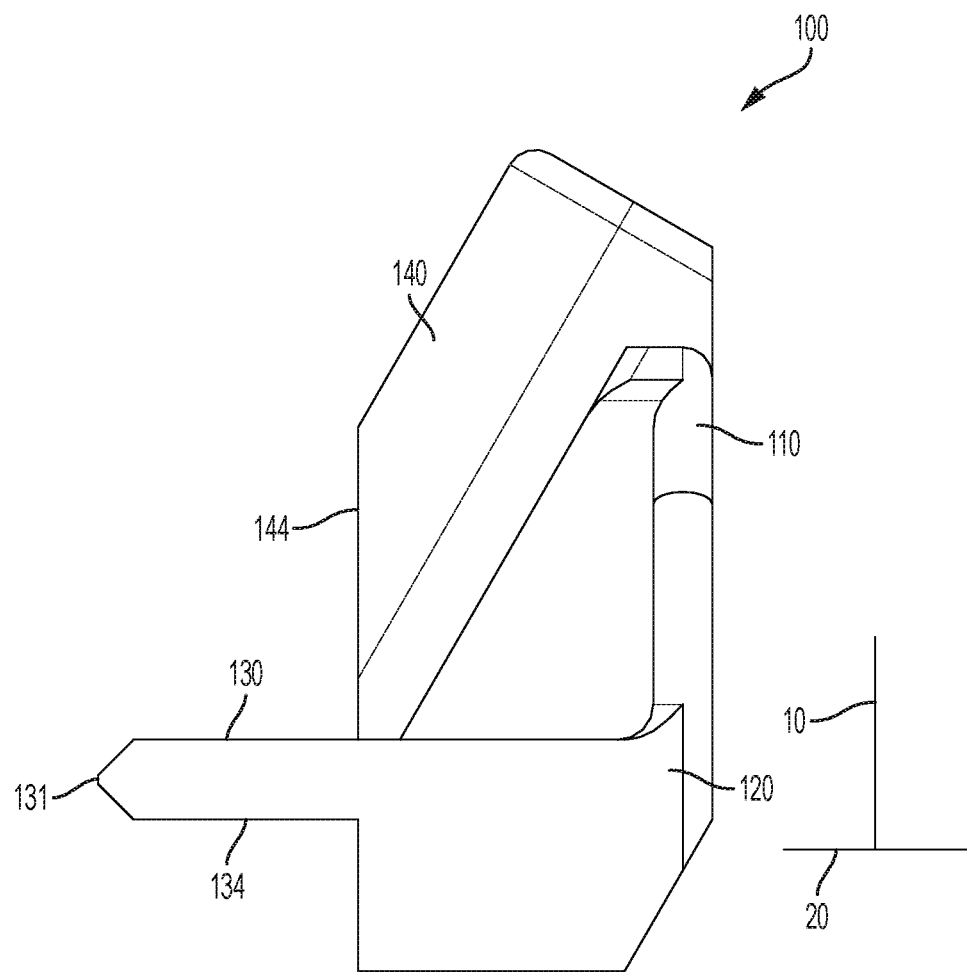
FIG. 5 is a right side view of predrill guide tool.
Figure 6:
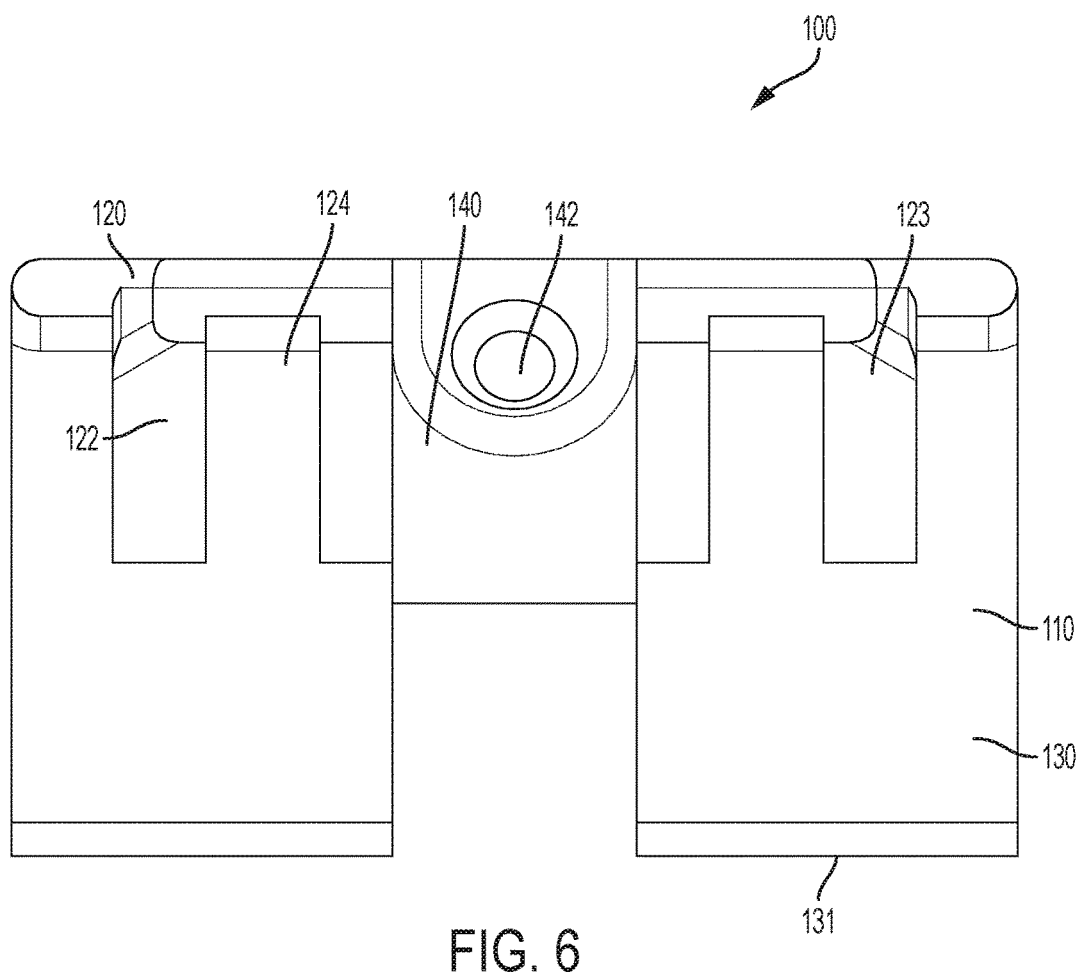
FIG. 6 is a top view of predrill guide tool.
Figure 7:
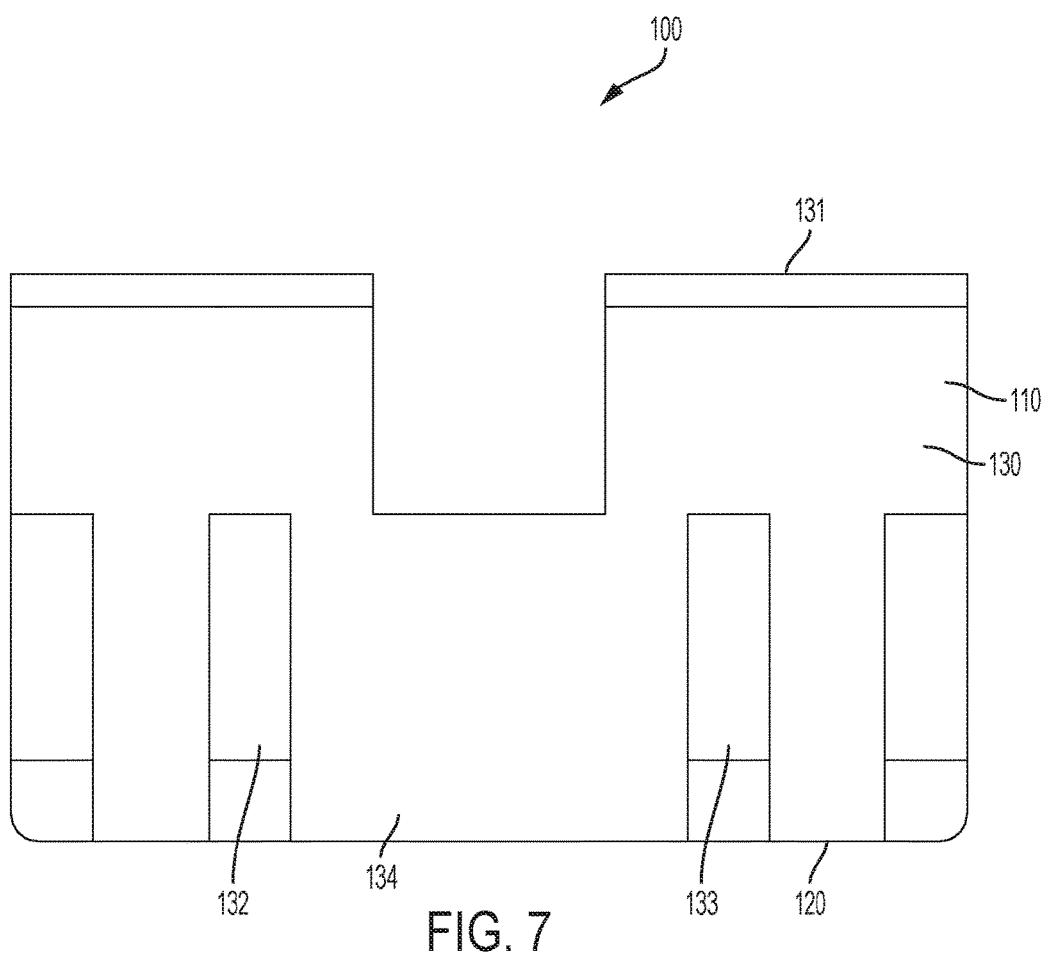
FIG. 7 is a bottom view of predrill guide tool.
Figure 8:
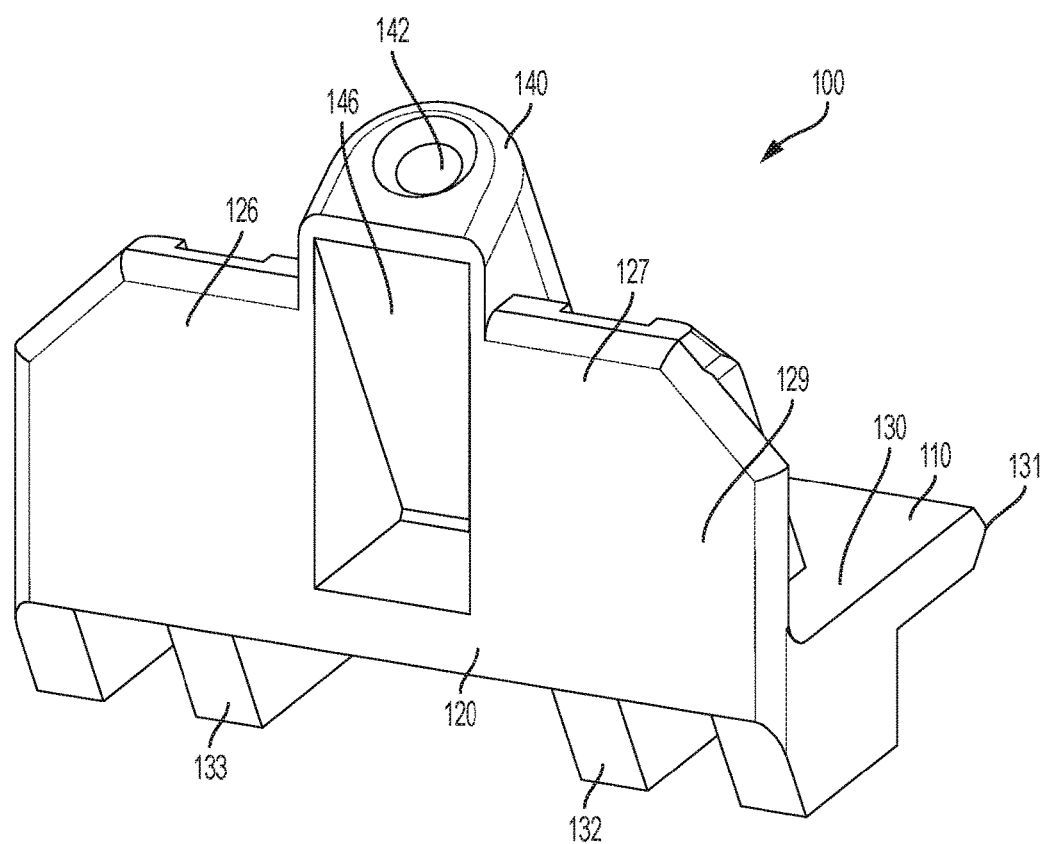
FIG. 8 is a back perspective view of predrill guide tool.
Figure 9:
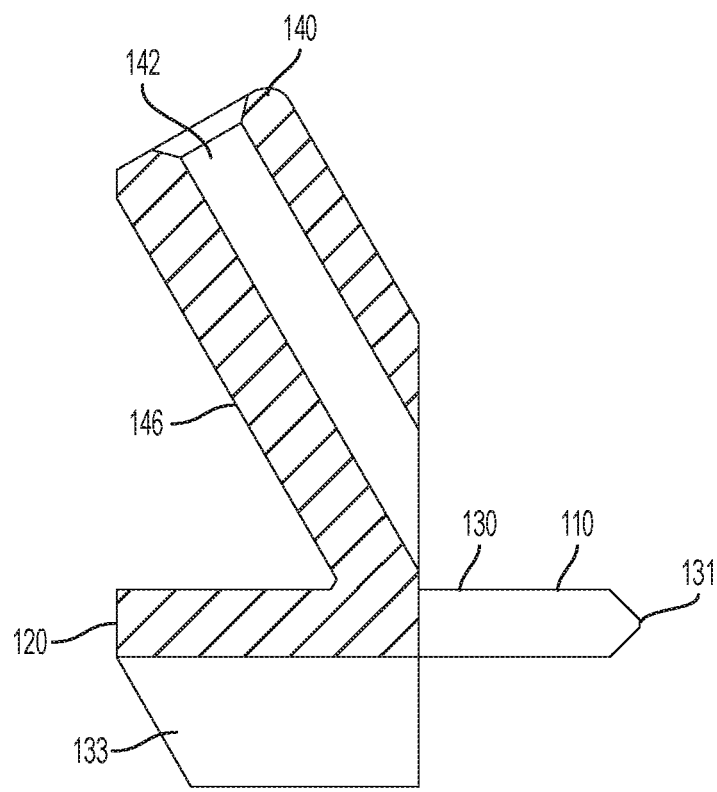
FIG. 9 is a cross-sectional view of the predrill guide tool along the lines 9-9 shown in FIG. 2.
Figure 10:
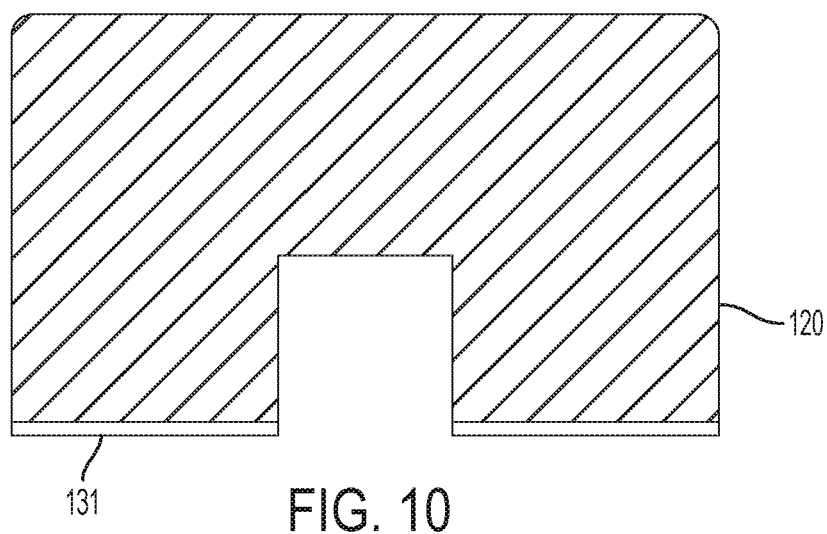
FIG. 10 is a cross-sectional view of the predrill guide tool along the lines 10-10 shown in FIG. 2.
Figure 11:
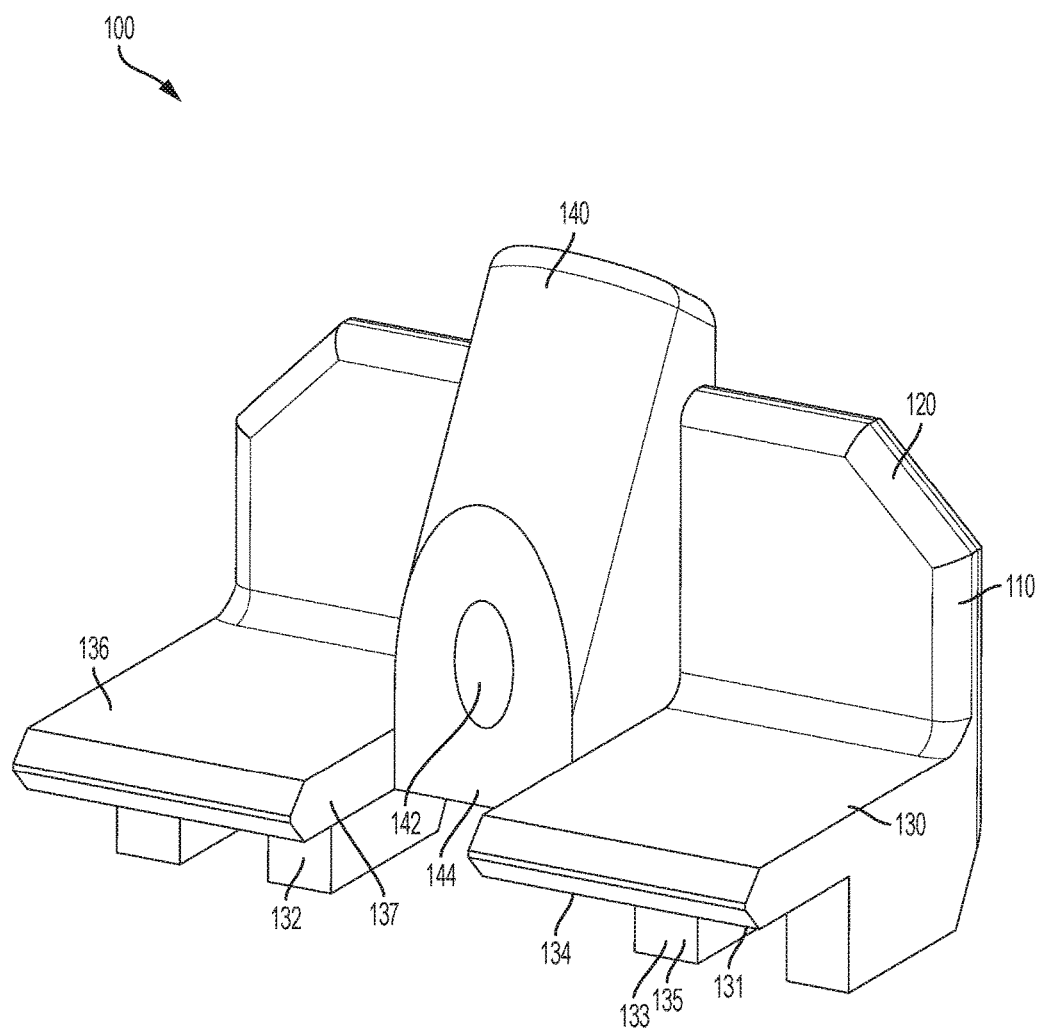
FIG. 11 is a front perspective view of another predrill guide tool.

FIGS. 1-11 illustrate views of predrill guide tools 100 according to the disclosure. The views include a front perspective view (FIG. 1), a front view (FIG. 2), a back view (FIG. 3), a left side view (FIG. 4), a right side view (FIG. 5), a top view (FIG. 6) a bottom view (FIG. 7); and a perspective view from the back (FIG. 8). Cross-sectional views are also provided which are through perpendicular planes (FIGS. 9-10). Another configuration of predrill tool 100 is also presented (FIG. 11).

The body 110 of the predrill guide tool 100 has a vertical planar member 120 which is in a vertical plane 10, and a horizontal planar member 130 which is in a horizontal plane 20 and which is positioned at one end of the vertical planar member 120. By way of example, the vertical planar member 120 has a height of about 1.1 inches from the top surface of the horizontal planar member, a width of about 1.7 inches, and a thickness of about 0.14 inches. The horizontal planar member 130 is configured such that one or more keels, including, for example, a first keel 132 and a second keel 133 extend from a bottom surface 134 of the horizontal planar member 130 along at least a portion of a length of the horizontal planar member 130. The horizontal planar member 130 has an inner surface 137. The one or more keels extending from the bottom surface of the planar member 130 can have a height of about 0.26 inches from the bottom surface of the planar member 130 and a thickness of 0.15 inches. The keels, for example first keel 132 and the second keel 133, have a front face 135 which is perpendicular to the bottom surface 134 of the horizontal planar member 130. A front edge 131 of the horizontal planar member 130 can be curved or tapered. The thickness of a front portion of the horizontal planar member 130 facilitates a snug fit within a groove formed in a deck board. The height of the keels, first keel 132 and second keel 133, is less than a distance between the deck board groove and a lower surface of the deck board which abuts the top of the joist. The distance between keel 132 and keel 133 can be, for example, 0.73 inches.

An upper surface 136 of the horizontal planar member 130 has one or more ribs, including for example a first angled rib 122 and a second angled rib 123 which extend upward from the upper surface 136 of the horizontal planar member 130 and from a front surface 124 of the vertical planar member 120.

An angled drill guide 140 is provided which engages the vertical planar member 120 at a cut out 126 and the sides of the first angled rib 122 and the second angled rib 123 on opposing sides of the angled drill guide 140. The angled drill guide 140 has a length of about 0.57 inches along its top surface and 1.0 inches along its bottom surface from the horizontal planar member 130. In another configuration, the vertical planar member 120 could provide an aperture through which the drill bit would pass. The angled drill guide 140 can be set at an angle of 60 degrees off of the horizontal plane 20. An aperture 142 is provided which passes through the angled drill guide 140. The aperture 142 has a diameter of about 0.425 inches. The angled drill guide 140 has a front face 144 which is perpendicular to the horizontal planar member 130. In another configuration of the angled drill guide 140, a semicircular guide can be provided at a 60 degree angle off the horizontal plane instead of a tubular guide as illustrated.

The vertical planar member 120 can have one or more vertical members, such as a first vertical member 126 and a second vertical member 127 which can be engaged by a user's finger during use and support ease of use with either the right hand or the left hand of a user. A recess 146 on the back surface 129 of the vertical planar member 120 can be provided which provides for uniform thickness of the body 110 when injection molded.

Turning to the configuration illustrated in FIG. 11, the body 110 of the predrill guide tool 100 has a vertical planar member 120 which is in a vertical plane 10, and a horizontal planar member 130 which is in a horizontal plane 20 and which is positioned at one end of the vertical planar member 120. The vertical planar member is similarly sized to the configuration shown in FIG. 1. The horizontal planar member 130 is configured such that one or more keels, including, for example, a first keel 132 and a second keel 133 extend from a bottom surface 134 of the horizontal planar member 130 along at least a portion of a length of the horizontal planar member 130. The keels, for example first keel 132 and the second keel 133, have a front face 135 which is perpendicular to the bottom surface 134 of the horizontal planar member 130. A front edge 131 of the horizontal planar member 130 can be curved or tapered. The thickness of a front portion of the horizontal planar member 130 facilitates a snug fit within a groove formed in a deck board. The height of the keels, first keel 132 and second keel 133, is less than a distance between the deck board groove and a lower surface of the deck board which abuts the top of the joist.

An angled drill guide 140 is provided which engages the vertical planar member 120 at a cut out 126 and the sides of the first angled rib 122 and the second angled rib 123 on opposing sides of the angled drill guide 140. In another configuration, the vertical planar member 120 could provide an aperture through which the drill bit would pass. The angled drill guide 140 can be set at an angle of 60 degrees off of the horizontal plane 20. An aperture 142 is provided which passes through the angled drill guide 140. The aperture 142 has a diameter of about 0.425 inches. The angled drill guide 140 has a front face 144 which is perpendicular to the horizontal planar member 130. In another configuration of the angled drill guide 140, a semicircular guide can be provided at a 60 degree angle off the horizontal plane instead of a tubular guide as illustrated.

Figure 12:
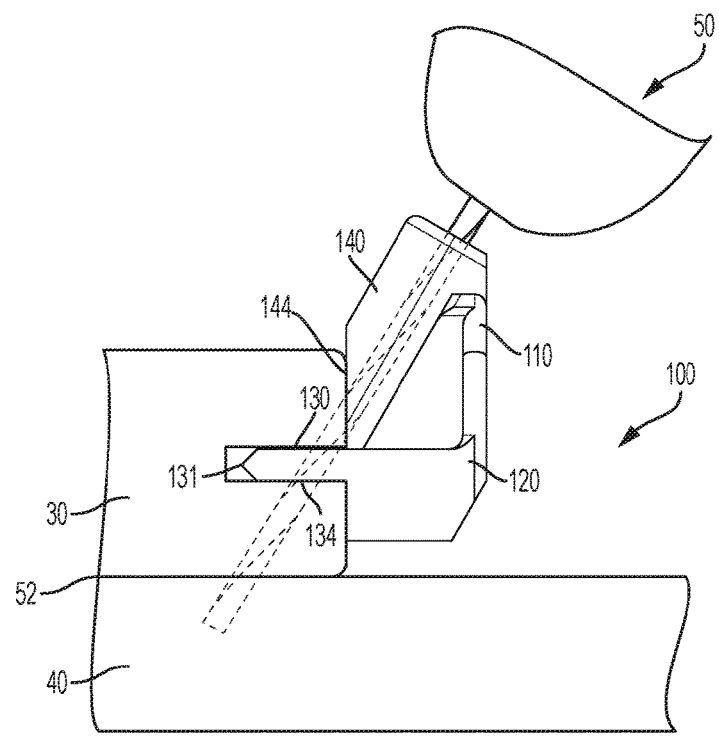
FIGS. 12-13 illustrate the predrill guide tool applied to a decking assembly.
Figure 13:
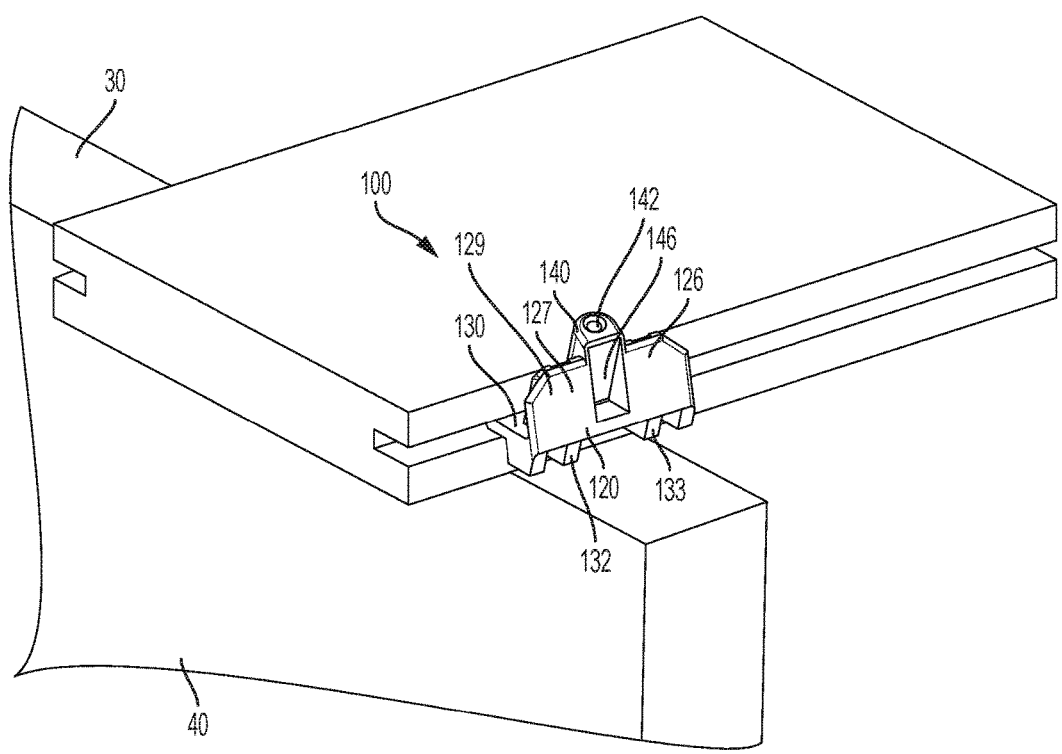

Turning to FIGS. 12-13, the predrill guide tool 100 is shown from a side view and a perspective view with the horizontal planar member 130 inserted into a groove 32 of a deck board 30 which is positioned on a joist 40. The front face 144 of the angled drill guide 140 abuts a side of the deck board 30 and a portion of the horizontal planar member 130 is positioned within the groove 32 of the deck board 30. A drill 50 having a drill bit 52 is illustrated passing through the angled drill guide 140 and allows a hole to be drilled through the upper portion of the deck board 30 (the portion above the groove 32) and the lower portion of the deck board 30 (the portion below the groove 32) and into the joist 40. The front face 135 of the keel can abut the side of the deck board 30 to facilitate maintaining a guide location during use.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:
1. A predrill guide tool comprising:
a body having
   a horizontal planar member with a top side, a bottom side and a first end along one end of the horizontal planar member,
   a vertical planar member positioned within a first vertical plane, with a front side facing towards the first end of the horizontal planar member and a back side, wherein the vertical planar member extends vertically from the top side of the horizontal planar member at an end opposite the first end of the horizontal planar member, and
   an angled drill guide extending from the front side of the vertical planar member at an angle towards the first end of the horizontal planar member with a lower surface positioned below the top side of the horizontal planar member and with a front face positioned within a second vertical plane parallel to the vertical planar member; and
one or more keels extending vertically from the bottom side of the horizontal planar member wherein the one or more keels are positioned perpendicularly to the vertical planar member.

2. The predrill guide tool of claim 1 wherein the angled drill guide has an aperture therethrough.

3. The predrill guide tool of claim 1 wherein the horizontal planar member has a first forward portion and a second forward portion on either side of the angled drill guide with an open space between the first forward portion and the second forward portion.

4. The predrill guide tool of claim 1 wherein a front face of the one or more keels is perpendicular to the bottom side of the horizontal planar member.

5. The predrill guide tool of claim 1 further comprising two or more ribs extending from a top side of the horizontal planar member.

6. The predrill guide tool of claim 1 wherein the first end is a tapered end.

7. A predrill guide tool comprising:
a body having
   a horizontal planar member with a top side, a bottom side and a first end along one end of the horizontal planar member,
   a vertical planar member positioned within a first vertical plane, with a front side facing towards the first end of the horizontal planar member and a back side, wherein the vertical planar member extends vertically from the top side of the horizontal planar member at an end opposite the first end of the horizontal planar member, and an angled drill guide extending from the front side of the vertical planar member at an angle towards the first end of the horizontal planar member with a lower surface positioned below the top side of the horizontal planar member and with a front face positioned within a second vertical plane parallel to the vertical planar member; and two or more ribs extending from a top side of the horizontal planar member wherein the two or more ribs are positioned perpendicular to the vertical planar member.

8. The predrill guide tool of claim 7 wherein the angled drill guide has an aperture therethrough.

9. The predrill guide tool of claim 7 wherein the horizontal planar member has a first forward portion and a second forward portion on either side of the angled drill guide with an open space between the first forward portion and the second forward portion.

10. The predrill guide tool of claim 7 further comprising one or more keels extending vertically from the bottom side of the horizontal planar member.

11. The predrill guide tool of claim 10 wherein a front face of the one or more keels is perpendicular to the bottom side of the horizontal planar member.

12. The predrill guide tool of claim 7 wherein the first end is a tapered end.

13. A predrill guide tool comprising:
a body means having
    a horizontal planar member means with a top side, a bottom side and a tapered end along one end of the horizontal planar member means,
    a vertical planar member means positioned within a first vertical plane, with a front side facing towards the tapered end of the horizontal planar member means and a back side, wherein the vertical planar member means extends vertically from the top side of the horizontal planar member means at an end opposite the first end of the horizontal planar member means, and
    an angled drill guide means extending from the front side of the vertical planar member means at an angle towards the first end of the horizontal planar member means with a lower surface positioned below the top side of the horizontal planar member means and with a front face positioned within a second vertical plane parallel to the vertical planar member means; and
one or more keel means extending vertically from the bottom side of the horizontal planar member means wherein the one or more keel means are positioned perpendicularly to the vertical planar member means.

14. The predrill guide tool of claim 13 wherein the angled drill guide means has an aperture therethrough.

15. The predrill guide tool of claim 13 wherein the horizontal planar member means has a first forward portion and a second forward portion on either side of the angled drill guide means with an open space between the first forward portion and the second forward portion.

16. The predrill guide tool of claim 13 wherein a front face of the one or more keel means is perpendicular to the bottom side of the horizontal planar member means.

17. The predrill guide tool of claim 13 further comprising two or more rib means extending from a top side of the horizontal planar member means.

18. A predrill guide tool comprising:
a body having
    a horizontal planar member means with a top side, a bottom side and a tapered end along one end of the horizontal planar member means,
    a vertical planar member means positioned within a first vertical plane, with a front side facing towards the tapered end of the horizontal planar member means and a back side, wherein the vertical planar member means extends vertically from the top side of the horizontal planar member means at an end opposite the first end of the horizontal planar member means, and
    an angled drill guide means extending from the front side of the vertical planar member means at an angle towards the first end of the horizontal planar member means with a lower surface positioned below the top side of the horizontal planar member means and with a front face positioned within a second vertical plane parallel to the vertical planar member means; and
two or more rib means extending from a top side of the horizontal planar member means wherein the two or more rib means are positioned perpendicularly to the vertical planar means.

19. The predrill guide tool of claim 18 wherein the angled drill guide means has an aperture therethrough.

20. The predrill guide tool of claim 18 wherein the horizontal planar member means has a first forward portion and a second forward portion on either side of the angled drill guide means with an open space between the first forward portion and the second forward portion.

21. The predrill guide tool of claim 18 further comprising one or more keel means extending vertically from the bottom side of the horizontal planar member means.

22. The predrill guide tool of claim 21 wherein a front face of the one or more keel means is perpendicular to the bottom side of the horizontal planar member means.

* * * * *